US012746873B1

(12) United States Patent
Altenor et al.

(10) Patent No.: US 12,746,873 B1
(45) Date of Patent: Sep. 29, 2026

(54) VEHICLE, FILTER SYSTEM FOR SAME, AND ASSOCIATED METHOD

(71) Applicant: Joseph E. Altenor, Greenville, PA (US)

(72) Inventors: Joseph E. Altenor, Greenville, PA (US); John P. Powers, Pittsburgh, PA (US)

(73) Assignee: Joseph E. Altenor, Greenville, PA (US)

( * ) Notice: Subject to any disclaimer, the term of this patent is extended or adjusted under 35 U.S.C. 154(b) by 0 days.

(21) Appl. No.: 19/418,941

(22) Filed: Dec. 13, 2025

(51) Int. Cl.
*B60Q 1/26* (2006.01)
*B60Q 1/50* (2006.01)
*G10L 15/22* (2006.01)

(52) U.S. Cl.
CPC .............. *B60Q 1/549* (2022.05); *G10L 15/22* (2013.01); *B60Q 2900/30* (2013.01); *G10L 2015/223* (2013.01)

(58) Field of Classification Search
CPC ..... B60Q 1/549; B60Q 2900/30; G10L 15/22; G10L 2015/223
See application file for complete search history.

(56) References Cited

U.S. PATENT DOCUMENTS

| | | | | |
|---|---|---|---|---|
| 7,659,808 | B1 * | 2/2010 | Cooper | B60Q 1/50 340/471 |
| 9,827,897 | B1 * | 11/2017 | Muir | B60Q 1/0035 |
| 9,969,326 | B2 * | 5/2018 | Ross | B60Q 5/005 |
| 10,945,116 | B2 * | 3/2021 | Kim | H04W 4/46 |
| 11,527,180 | B2 * | 12/2022 | Milner | G09F 13/04 |
| 11,884,205 | B2 * | 1/2024 | Stanley | B60Q 1/268 |

* cited by examiner

*Primary Examiner* — Toan N Pham
(74) *Attorney, Agent, or Firm* — The Powers IP Law Firm

(57) ABSTRACT

A vehicle is provided. The vehicle includes a body and a filter system. The filter system includes a device associated with the body, a processor electrically connected to the display apparatus, and a memory comprising instructions that, when executed by the processor, cause the processor to perform operations including receive a command from an occupant of the vehicle, filter the command to determine whether the command has kind and positive intent, and either transmit the command to the device if the command has been determined to have kind and positive intent, and cause the device to output the command in a manner that is receivable from outside the vehicle, or prevent the command from being transmitted to the device if the command has been determined to not have kind and positive intent.

20 Claims, 4 Drawing Sheets

VEHICLE, FILTER SYSTEM FOR SAME, AND ASSOCIATED METHOD

BACKGROUND OF THE INVENTION

Currently, communication between drivers on the road is not ideal. Specifically, if drivers move with respect to each other, there are not sufficient modalities to allow them to communicate with each other, such as when one driver allows another driver to merge into a common lane, or when two drivers approach a stop sign at nearly the same time, and one driver allows another driver to pass through the intersection first.

As a result, drivers on the road often become aggravated with each other. Even more so, they are often rude and don't show respect for each other. Road rage, for instance, is a common problem on the road, and often involves drivers behaving aggressively toward each other. It is therefore desirable for drivers on the road, and in life, to get along with each other in a loving manner. Doing so would cause people to change their perspectives and treat each other with kindness.

It is with respect to these and other considerations that the instant disclosure is concerned.

SUMMARY

In one example a vehicle is provided. The vehicle comprises a body; and a filter system, comprising a device associated with the body, a processor electrically connected to the display apparatus, and a memory comprising instructions that, when executed by the processor, cause the processor to perform operations comprising receive a command from an occupant of the vehicle, filter the command to determine whether the command has kind and positive intent, and either transmit the command to the device if the command has been determined to have kind and positive intent, and cause the device to output the command in a manner that is receivable from outside the vehicle, or prevent the command from being transmitted to the device if the command has been determined to not have kind and positive intent.

In another example, a filter system for the aforementioned vehicle is provided.

In yet another example, a method is provided. The method comprises receiving a command from an occupant of the vehicle, filtering the command to determine whether the command has kind and positive intent, and either transmitting the command to the device if the command has been determined to have kind and positive intent, and cause the device to output the command in a manner that is receivable from outside the vehicle, or preventing the command from being transmitted to the device if the command has been determined to not have kind and positive intent.

It is to be understood that both the foregoing general description and the following detailed description are exemplary and explanatory and are intended to provide further explanation of the invention as claimed.

DETAILED DESCRIPTION OF THE INVENTION

Figure 1A:
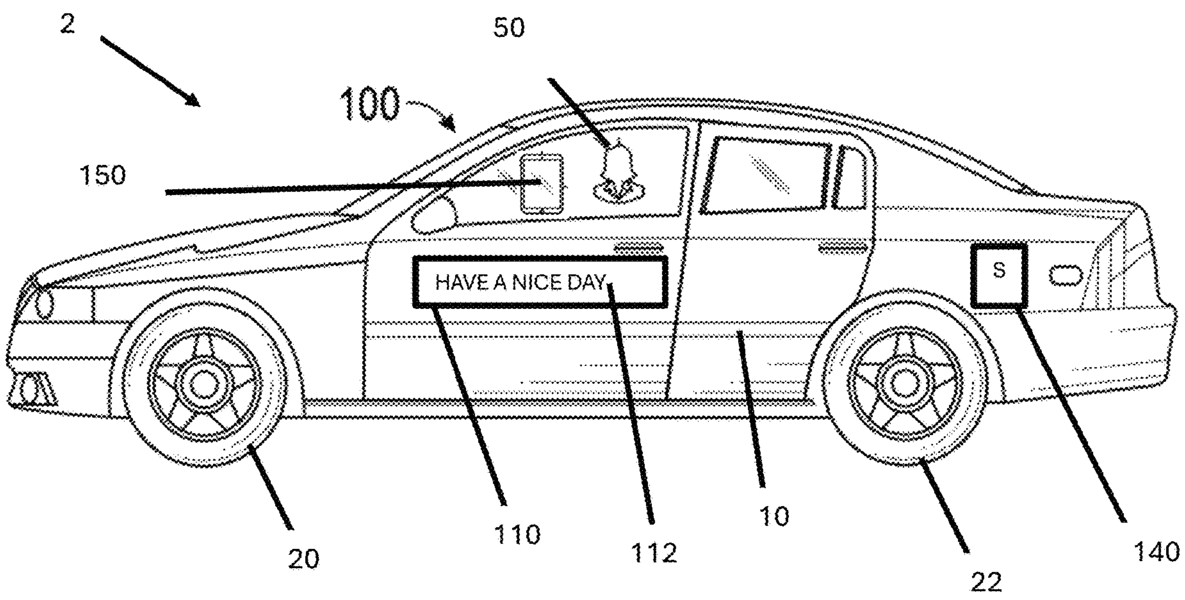
FIG. 1A shows a vehicle and filter system for the same, along with an occupant positioned inside the vehicle, partially shown in simplified form, and shown as employed with a mobile device, in accordance with one non-limiting embodiment of the disclosed concept.

In the following description, for the purposes of explanation, numerous specific details are set forth in order to provide a thorough understanding of various embodiments of the invention. As used herein, "embodiments" are non-limiting examples of apparatuses or methods employing one or more of the inventive concepts disclosed herein. It is apparent, however, that various embodiments may be practiced without these specific details or with one or more equivalent arrangements. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features of the various embodiments may be otherwise combined, separated, interchanged, and/or rearranged without departing from the inventive concepts.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "may include," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, may be used as terms of approximation and not as terms of degree, and, as such, are utilized to account for inherent deviations in measured, calculated, and/or provided values that would be recognized by one of ordinary skill in the art.

As employed herein, the term "coupled" shall mean connected together either directly or via one or more intermediate parts or components.

As employed herein, the term "number" shall mean one or an integer greater than one (i.e., a plurality).

As used herein, the phrase "electrically connected" shall mean connected together via wires and/or connected together wirelessly in order to allow for electrical communication between two devices.

As employed herein, the phrase "machine learning model" may comprise a computer program that has learned from raw data how to perform a specific task, and without being explicitly hand-coded with rules for every possible case. In one example, machine learning models in accordance with the disclosed concept may be pattern recognizers that provide more accurate outputs as more example data is received into them. Machine learning models may also be mathematical functions that turn input data into a prediction or a decision As employed herein, the phrase "sentiment analysis machine learning model" may comprise a type of machine learning model (e.g., without limitation, a trained neural network and/or other machine learning algorithm) that takes a piece of text as input and predicts whether the emotion or opinion expressed in that text is positive, negative, or neutral (sometimes with a score or finer labels like "very positive," "mixed," etc.). Sentiment analysis machine learning models in accordance with the disclosed concept may use any or all of the use of natural language processing, text analysis, computational linguistics, and biometrics to systematically identify, extract, quantify, and study affective states and subjective information. Sentiment analysis machine learning models in accordance with the disclosed concept may be configured and/or associated with predetermined materials such as reviews and survey responses, online and social media, and healthcare materials for applications that range from marketing to customer service to clinical medicine. Sentiment analysis machine learning models in accordance with the disclosed concept may be associated with deep language models in order to analyze relatively difficult data domains, such as news texts where authors typically express their opinions/sentiment less explicitly.

As employed herein, the phrase "toxicity classifier machine learning model" may include a type of machine learning model (e.g., without limitation, a trained neural network) that reads a piece of text, compares that piece of text to other data, and in turn predicts how rude, disrespectful, hateful, threatening, or harmful it is to another person or group—usually outputting a score from 0 to 1 (or 0-100) and sometimes specific sub-labels.

As employed herein, the phrase "emotion classifier machine learning model" may include a type of machine learning model (e.g., without limitation, a trained neural network) that reads a piece of text, compares that text to other data, and predicts which specific emotion(s) the writer is expressing—usually choosing from a fixed set of emotions (far more detailed than just positive/negative/neutral).

As employed herein, the phrase "sarcasm machine learning model" may include a type of machine learning model (e.g., without limitation, a trained neural network) that reads a piece of text, compares that text to other data, and predicts whether the author of that text is being sarcastic—i.e., saying the opposite of what they really mean, usually to mock or criticize.

As employed herein, the phrase "context-aware machine learning model" may include a type of machine learning model (e.g., without limitation, a trained neural network) that does not look only at a single sentence in isolation, but instead, reads and remembers an entire conversation history, previous messages, or surrounding paragraphs before making its prediction.

As employed herein, the phrase "specific intent machine learning model" may include a type of machine learning model (e.g., without limitation, a trained neural network) that has been narrowly trained (e.g., without limitation, fine-tuned) to recognize one precise real-world intention or harmful behavior in text, rather than giving a general score such as "toxicity" or "negative sentiment". In one example, a specific intent machine learning model may answers relatively concrete yes/no (or probability) questions.

As employed herein, the phrase "deception and lie detection machine learning model" may include a type of machine learning model (e.g., without limitation, a trained neural network) that is trained to spot when someone is intentionally misleading, gaslighting, denying facts, faking emotions, and/or straight up lying in their text.

As employed herein, the phrase "grooming and predatory behavior machine learning model" may include a type of machine learning model (e.g., without limitation, a trained neural network) that receives data and detects exact language patterns that sexual predators (e.g., especially child predators) use when they try to build trust, lower boundaries, isolate, and sexually exploit someone online.

As employed herein, the phrase "manipulation and coercion machine learning model" may include a type of machine learning model (e.g., without limitation, a trained neural network) that receives data and detects when someone is using psychological pressure, guilt, threats, shame, love-bombing, future-faking, or other emotional tactics to force or trick another person into doing something against their genuine will. Such a model may not have as a primary focus profanity or overt threats, but instead have as a primary focus the detection of overt control that often sounds caring, logical, or morally righteous on the surface.

As employed herein, the phrase "hate speech machine learning model" may include a type of machine learning model (e.g., without limitation, a trained neural network) that receives data and compares that data with other data in order to detect language that attacks, dehumanizes, incites violence against, or expresses hatred toward people because of protected characteristics (e.g., without limitation, race, ethnicity, religion, gender, sexual orientation, disability, nationality, etc.).

As employed herein, the phrase "stance detection machine learning model" may include a type of machine learning model (e.g., without limitation, a trained neural network) that receives data and compares that data with other data in order to answer one very specific question about a piece of text. Such a model may not be concerned about sentiment, toxicity, or emotion, but instead may be concerned with whether the author of the text supports, opposes, or stay neutral on a topic, person, policy, group, or statement.

As employed herein, the phrase "entailment machine learning model" (e.g., without limitation, a natural language inference machine learning model) may include a type of machine learning model (e.g., without limitation, a trained neural network) that receives data and compares that data with other data in order to answer one precise logical question about two pieces of text (e.g., without limitation, given a premise and a hypothesis, does the premise entail the hypothesis, contradict the hypothesis, or be neutral with respect to the hypothesis?

As employed herein, the phrase "user-level risk machine learning model" may include a type of machine learning model (e.g., without limitation, a trained neural network) that receives data and compares that data with other data in order to analyze an individual user's historical behavior, metadata, and network patterns across a platform to assign a risk score indicating how likely that user is to post harmful content, engage in abuse, scams, or violations in the future. Unlike message-level models, a user-level risk machine learning model in accordance with the disclosed concept may operate at an account level to proactively flag high-risk users for close scrutiny.

As employed herein, the phrase "multimodal signal machine learning model" may include a type of machine learning model (e.g., without limitation, a trained neural network) that receives data and compares that data to other data to simultaneously process two or more data types and fuse them to make a much more accurate prediction than any single modality alone.

As employed herein, the phrase "temporal escalation detector machine learning model" may include a type of machine learning model (e.g., without limitation, a trained neural network) that receives data and compares that data to other data to watch a conversation or user history over time, and predict when someone is gradually moving from normal behavior to manipulative behavior to abusive behavior to dangerous behavior, and ultimately predict whether the user text is escalating in terms of harm.

It will be appreciated that a machine learning model including any of the above machine learning models may have zero-shot and few-shot capabilities in order to be relatively powerful at detecting intent and moderation.

As employed herein, the phrase "kind and positive intent" may correspond to a human disposition determinable by a machine learning model as disclosed herein, and wherein said machine learning model may be trained to rate as "kind and positive" aspects of a disposition that are any one or any combination of sincerely loving, sincerely empathetic, sincerely generous, sincerely courageous, and sincerely respectful.

As employed herein, a "mobile device" may mean a device capable of sending a cellular transmission, whether a separate device such as a phone, tablet, and the like, and/or whether integral and/or electrically connected to a processor of a vehicle (e.g., with wires or without wires).

FIG. 1A shows a vehicle 2 as employed with a mobile device 150, in accordance with one non-limiting embodiment of the disclosed concept. The vehicle 2 may include a body 10, a number of wheels 20,22 coupled to the body and configured to allow the body 10 to roll on the ground and be driven, as well as a filter system 100. While the vehicle 2 is shown as being a four-door sedan, it will be appreciated that vehicles in accordance with the disclosed concept may be any suitable vehicle configured to be driven on the road, including, for example, trucks, buses, sports utility vehicles, motorcycles, other sedans, and the like. Additionally, as will be discussed in detail below, the filter system 100 advantageously allows certain commands from an occupant 50 of the vehicle 2 to be communicated to other drivers on the road, and in a manner wherein those commands are filtered in order to prevent commands which have unkind and negative intent from being communicated to other drivers on the road.

Figure 1B:
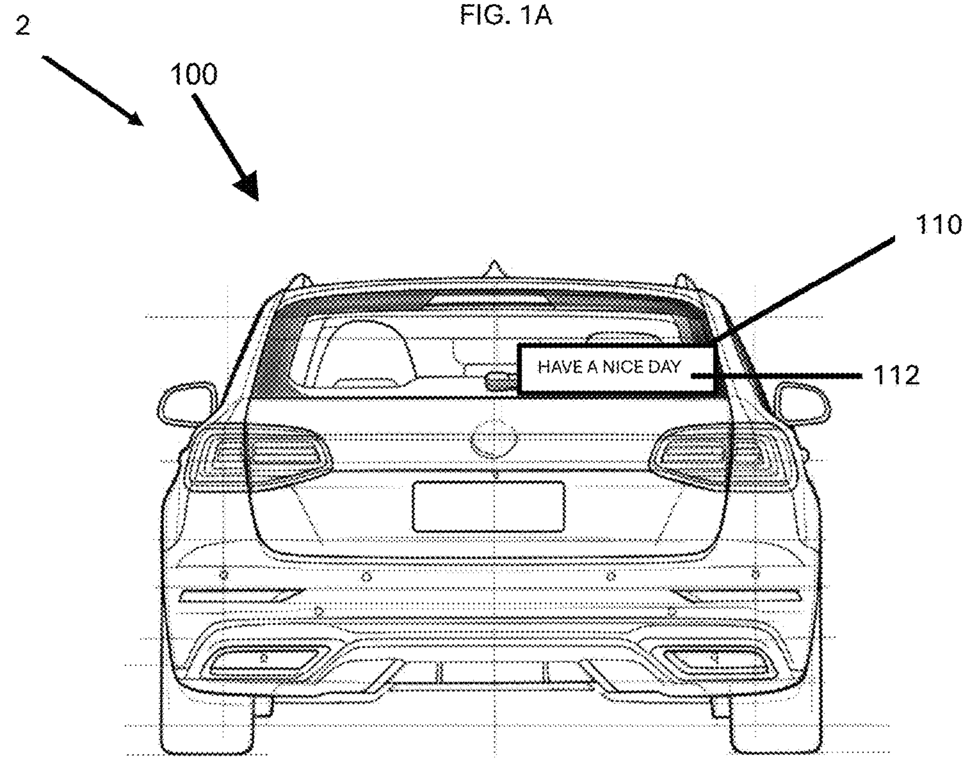
FIG. 1B shows another view of the vehicle and filter system of FIG. 1A, and shown with a device coupled to a rear windshield.
Figure 2:
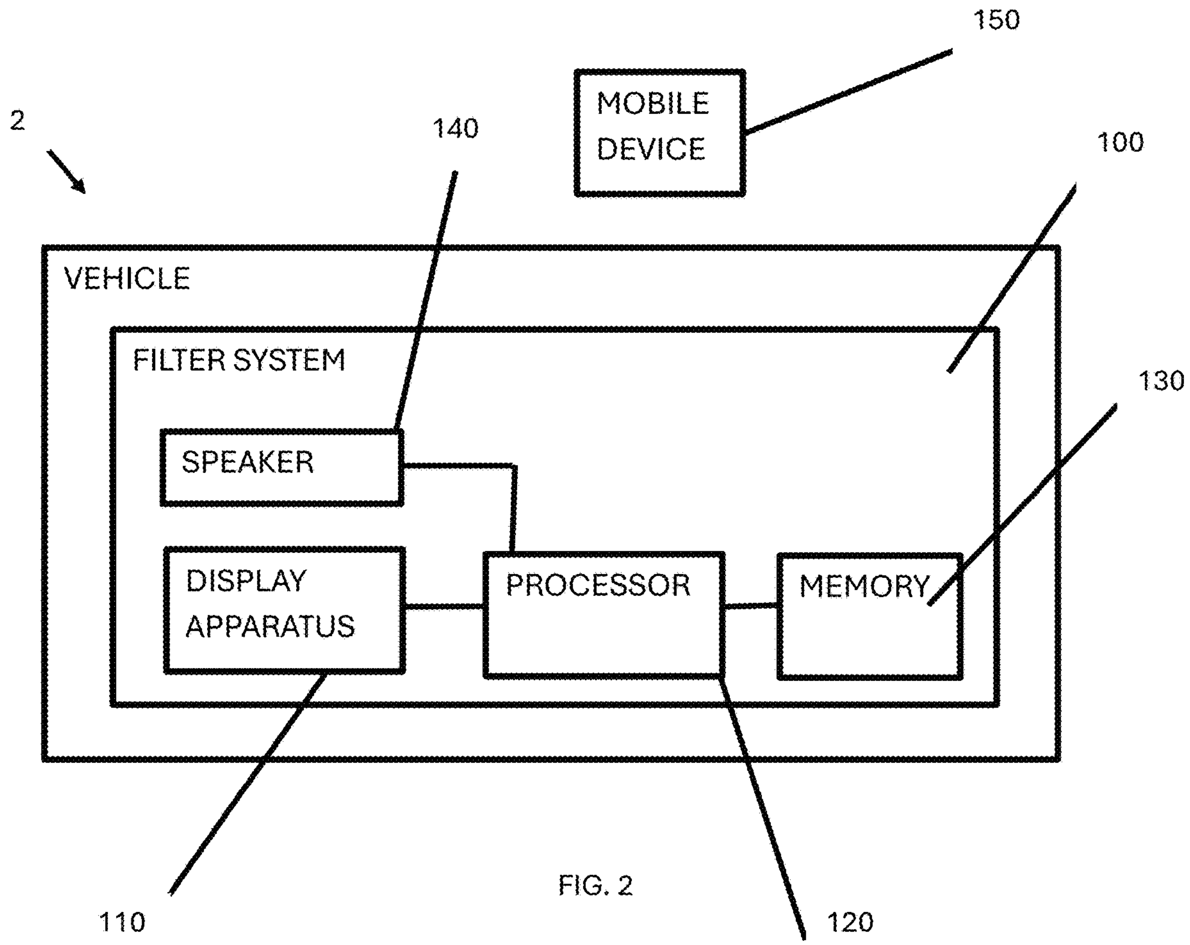
FIG. 2 shows a simplified view of the vehicle and filter system for the same of FIG. 1A.

More specifically, and with reference to FIGS. 1A-2, the filter system 100 may include a device, which may be a display apparatus 110 (e.g., without limitation, liquid crystal display, light-emitting diode display, quantum dot display, and the like) and/or a speaker "S" 140. The filter system 100 may also include a processor 120 electrically connected to the display apparatus 110 and the speaker 140, and a memory 130.

In one example, the display apparatus 110 may be coupled to the body 10 of the vehicle at an exterior portion of the driver's side door, and the speaker 140 may also be positioned at an exterior of the body 10. It will, however, be appreciated that the display apparatus 110 and speaker 140 in accordance with the disclosed concept may be coupled to the body 10 of the vehicle 2 at any suitable position. For example and without limitation, the display apparatus 110 may be coupled to an interior portion or exterior portion thereof, as well as positioned on an interior or exterior of any window of the vehicle 2, and/or positioned on any door or frame member of the body 10 of the vehicle 2. See, for example, FIG. 1B, which shows the display apparatus 110 coupled to a rear windshield of the vehicle 2. Additionally, the speaker 140 may be coupled to any portion of the vehicle 2 so as to emit an audio signal sent by the processor 120 and hearable from outside of the vehicle.

In accordance with the disclosed concept, the filter system 100 is advantageously configured to filter commands from the occupant 50 (FIG. 1A), and only allow displaying of content, audio transmission of content, and/or other transmission of content (e.g., via the mobile device 150, which may be associated with the occupant 50 of the vehicle 2) when the command is determined to have kind and positive intent. More specifically, the memory 130 includes instructions that, when executed by the processor, cause the processor to perform certain operations.

Figure 3:
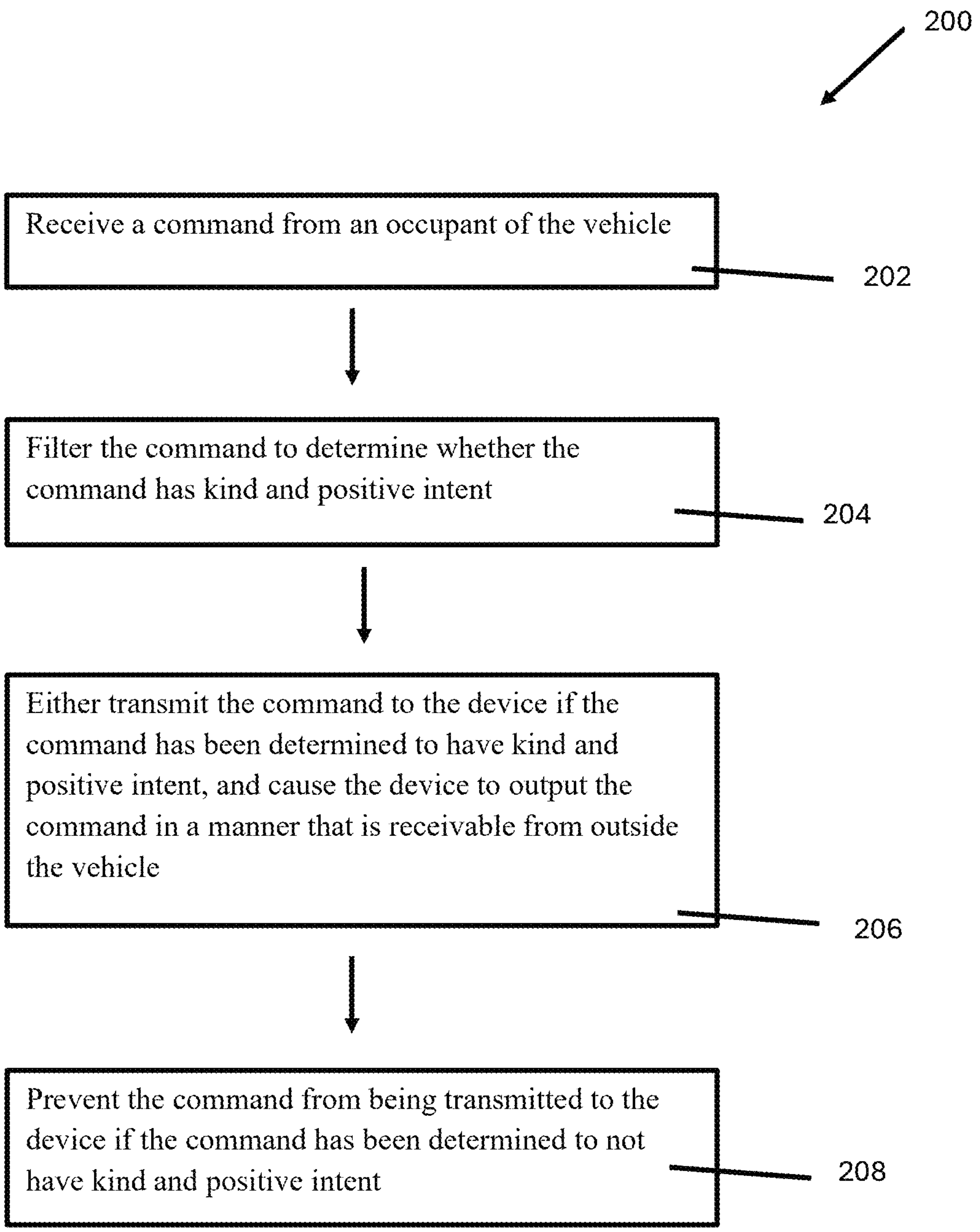
FIG. 3 shows an example non-limiting method that may be performed by a processor of the vehicle of FIGS. 1A-2.

Examples of these operations are listed are shown in the method 200 depicted in FIG. 3. These operations include a first operation step 202 of receive a command from the occupant 50 of the vehicle 2 (e.g., without limitation, receive an audio command spoken by the occupant 50 of the vehicle 2 and received into the processor 120 via a microphone of the vehicle 2), a second operation step 204 of filter the command to determine whether the command has kind and positive intent, and either a third operation step 206 of transmit the command to the device (e.g., the display apparatus 110, the speaker 140, and/or the mobile device 150) if the command has been determined to have kind and positive intent, and cause the device 110,140,150 to output the command in a manner that is receivable from outside the vehicle 2, or prevent the command from being transmitted to the device 110,140,150 if the command has been determined to not have kind and positive intent.

Figure 4:
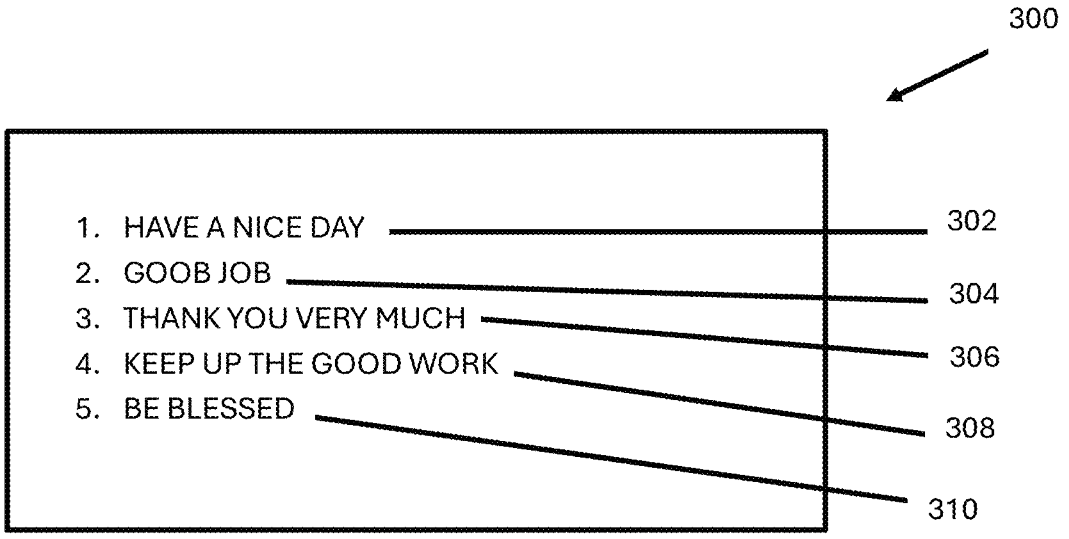
FIG. 4 shows a list of messages predetermined to have kind and positive intent, and storable in a memory of the vehicle.

FIG. 4 shows a list 300 of a plurality of messages 302,304,306,308,310 predetermined to have kind and positive intent. In one example, the list 300 may be digitized and stored in the memory 130 of the vehicle 2. In one example, the list 300 may be modifiable via receipt of signals from outside the vehicle 2 and sent to the processor 120 (e.g., people may be able to add other messages to and subtract messages from the list 300 such that the list 300 is not static). As a result, the memory 130 may further include instructions that, when executed by the processor 120, cause the processor 120 to refer to the list 300, such that the second operation step 204 may include determining whether the command corresponds to one of the plurality of messages 302,304,306,308,310 predetermined to have kind and positive intent.

In this manner, the portion of the third operation step 206 corresponding cause the device 110,140,150 to output the command in a manner that is receivable from outside the vehicle 2 may include display the one of the plurality of messages 302,304,306,308,310 predetermined to have kind and positive intent because the command has been determined to correspond to the one of the plurality of messages 302,304,306,308,310 predetermined to have kind and positive intent. This is depicted in FIG. 1A, wherein the occupant 50 has given a command (e.g., without limitation, a voice command) to the processor 120 via a microphone of the vehicle 2, and in response, the display apparatus 110 has displayed the message 112 of "HAVE A NICE DAY". The message 112 (FIG. 1A) thus corresponds to the first message 302 on the list 300 of FIG. 4 that has been predetermined to have kind and positive intent.

Additionally, the portion of the third operation step 206 corresponding to cause the device 110,140,150 to output the command in a manner that is receivable from outside the vehicle 2 may also include emit an audio signal with the speaker 140 of the one of the plurality of messages 302, 304,306,308,310 predetermined to have kind and positive intent because the command has been determined to correspond to the one of the plurality of messages 302,304,306, 308,310 predetermined to have kind and positive intent. Moreover, the portion of the third operation step 206 corresponding to cause the device 110,140,150 to output the command in a manner that is receivable from outside the vehicle 2 may include sending a transmission with the mobile device 150 of the one of the plurality of messages 302,304,306,308,310 predetermined to have kind and positive intent because the command has been determined to correspond to the one of the plurality of messages 302,304, 306,308,310 predetermined to have kind and positive intent.

It will also be appreciated that the connection between the command given by the occupant 50 and a given one of the messages 302,304,306,308,310 need not be a one-to-one digital match. For instance, it will be appreciated the processor 120 may analyze the command to determine how similar the command is to one of the messages 302,304, 306,308,310 on the list. In one example, determining whether the command from the occupant 50 corresponds to one of the plurality of messages 302,304,306,308,310 predetermined to have kind and positive intent includes employing a machine learning model with the command to determine whether the command corresponds to the one of the plurality of messages 302,304,306,308,310 predetermined to have kind and positive intent. The machine learning model in accordance with the disclosed concept may include at least one of a sentiment analysis machine learning model, a toxicity classifier machine learning model, an emotion classifier machine learning model, a sarcasm machine learning model, a context-aware machine learning model, a specific intent machine learning model, a deception and lie detection machine learning model, a grooming and predatory behavior machine learning model, a manipulation and coercion machine learning model, a hate speech machine learning model, a stance detection machine learning model, an entailment machine learning model, a user-level risk machine learning model, a multimodal signal machine learning model, and a temporal escalation detector machine learning model.

As a result, if the command from the occupant were to be “HAVE A GOOD DAY”, the processor 120 is configured to employ the above disclosed machine learning model(s) on such a command, and determine that the intent behind the command corresponds to the first message 302. On the other hand, the machine learning model(s) employed by the processor 120 may also be configured such that in response to receiving a command with unkind and negative intent (e.g., without limitation, “YOU’RE LOUSY”), no new message will be outputted by the processor 120 (e.g., and will not be displayed by the display apparatus 110, or sent to the speaker 140 or the mobile device 150) because the command “YOU’RE LOUSY” does not correspond to one to the messages 302,304,306,308,310 to at least a predetermined digital match level. In this manner, positive communication is promoted on the roadway, thereby minimizing the occurrence of road rage and other communication related dangers.

In another example, it is also within the scope of the disclosed concept that any one or all of the above disclosed machine learning models may be applied to a command to determine whether the command has kind and positive intent, and for the command to be outputted (e.g., without limitation, directly outputted) by the processor without being constrained by the list 300 (e.g., without limitation, being able to output the command directly as it is spoken, even if the command differs from the list 300), provided the machine learning model(s) determine that the base command has kind and positive intent. In such an example, causing the device 110,150,160 to output the command in a manner that is receivable from outside the vehicle 2 may include displaying the command with the display apparatus 110 because the command has been determined to have kind and positive intent, and/or emitting an audio signal with the speaker 140 corresponding to the command because the command has been determined to have kind and positive intent, and/or sending a transmission with the mobile device 150 corresponding to the command because the command has been determined to have kind and positive intent, and in one example, all without being limited to the messages 302,304,306,308,310.

It will be understood that the abovementioned arrangements of apparatus are merely illustrative of applications of the principles of this invention and many other embodiments and modifications may be made without departing from the spirit and scope of the invention as defined in the claims.

What is claimed is:

1. A vehicle, comprising:
a body; and
a filter system, comprising:
at least one of a display apparatus and a speaker coupled to the body,
a processor electrically connected to the at least one of the display apparatus and the speaker, and
a memory comprising instructions that, when executed by the processor, cause the processor to perform operations comprising:
receive a command from an occupant of the vehicle,
filter the command using at least one machine learning model trained to identify kind and positive intent, and/or refer to a list of a plurality of messages predetermined to have kind and positive intent stored in the memory, in order to determine whether the command has kind and positive intent, and
transmit the command or one of the plurality of messages to the at least one of the display apparatus and the speaker if the command has been determined to have kind and positive intent, and cause the at least one of the display apparatus and the speaker to output the command or the one of the plurality of messages in a manner that is receivable from outside the vehicle, or
prevent the command from being transmitted to the at least one of the display apparatus and the speaker if the command has been determined to not have kind and positive intent.

2. The vehicle according to claim 1, wherein the memory comprises instructions that, when executed by the processor, cause the processor to refer to the list of the plurality of messages predetermined to have kind and positive intent, and wherein refer to the list comprises determine whether the command corresponds to one of the plurality of messages predetermined to have kind and positive intent.

3. The vehicle according to claim 2, wherein cause the at least one of the display apparatus and the speaker to output the command or the one of the plurality of messages in a manner that is receivable from outside the vehicle comprises display the one of the plurality of messages predetermined to have kind and positive intent because the command has been determined to correspond to the one of the plurality of messages predetermined to have kind and positive intent.

4. The vehicle according to claim 3, wherein determine whether the command corresponds to one of the plurality of messages predetermined to have kind and positive intent comprises employ the at least one machine learning model with the command to determine whether the command corresponds to the one of the plurality of messages predetermined to have kind and positive intent.

5. The vehicle according to claim 4, wherein the at least one machine learning model comprises a neural network.

6. The vehicle according to claim 4, wherein receive the command comprises receive an audio command from the occupant of the vehicle.

7. The vehicle according to claim 4, wherein the at least one machine learning model comprises at least one of a sentiment analysis machine learning model, a toxicity classifier machine learning model, an emotion classifier machine learning model, a sarcasm machine learning model, a context-aware machine learning model, a specific intent machine learning model, a deception and lie detection machine learning model, a grooming and predatory behavior machine learning model, a manipulation and coercion machine learning model, a hate speech machine learning model, a stance detection machine learning model, an entailment machine learning model, a user-level risk machine learning model, a multimodal signal machine learning model, and a temporal escalation detector machine learning model.

8. The vehicle according to claim 7, wherein the at least one machine learning model comprises at least one of the sentiment analysis machine learning model and the toxicity classifier machine learning model.

9. The vehicle according to claim 2, wherein cause the at least one of the display apparatus and the speaker to output the command or the one of the plurality of messages in a manner that is receivable from outside the vehicle comprises emit an audio signal with the speaker of the one of the plurality of messages predetermined to have kind and positive intent because the command has been determined to correspond to the one of the plurality of messages predetermined to have kind and positive intent.

10. The vehicle according to claim 9, wherein determine whether the command corresponds to one of the plurality of messages predetermined to have kind and positive intent comprises employ the at least one machine learning model with the command to determine whether the command corresponds to the one of the plurality of messages predetermined to have kind and positive intent.

11. The vehicle according to claim 1, wherein the memory comprises instructions that, when executed by the processor, cause the processor to filter the command using the at least one machine learning model trained to identify kind and positive intent.

12. The vehicle according to claim 11, cause the at least one of the display apparatus and the speaker to output the command or the one of the plurality of messages in a manner that is receivable from outside the vehicle comprises display the command with the display apparatus because the command has been determined to have kind and positive intent.

13. The vehicle according to claim 11, wherein cause the at least one of the display apparatus and the speaker to output the command or the one of the plurality of messages in a manner that is receivable from outside the vehicle comprises emit an audio signal with the speaker corresponding to the command because the command has been determined to have kind and positive intent.

14. The vehicle according to claim 11, wherein the at least one machine learning model comprises a neural network.

15. A filter system for a vehicle, comprising:

at least one of a display apparatus and a speaker coupled to a body of the vehicle;

a processor electrically connected to the at least one of the display apparatus and the speaker; and a memory comprising instructions that, when executed by the processor, cause the processor to perform operations comprising:

receive a command from an occupant of the vehicle, filter the command using at least one machine learning model trained to identify kind and positive intent, and/or refer to a list of a plurality of messages predetermined to have kind and positive intent stored in the memory, in order to determine whether the command has kind and positive intent, and transmit the command or one of the plurality of messages to the at least one of the display apparatus and the speaker if the command has been determined to have kind and positive intent, and cause the at least one of the display apparatus and the speaker to output the command or the one of the plurality of messages in a manner that is receivable from outside the vehicle, or prevent the command from being transmitted to the at least one of the display apparatus and the speaker if the command has been determined to not have kind and positive intent.

16. A method, comprising:

receiving a command from an occupant of a vehicle;

filtering the command using at least one machine learning model trained to identify kind and positive intent, and/or referring to a list of a plurality of messages predetermined to have kind and positive intent stored in the memory, in order to determine whether the command has kind and positive intent; and transmitting the command or one of the plurality of messages to at least one of a display apparatus, a speaker, and a mobile device associated with the vehicle if the command has been determined to have kind and positive intent, and cause the at least one of the display apparatus, the speaker, and the mobile device to output the command or the one of the plurality of messages in a manner that is receivable from outside the vehicle, or preventing the command from being transmitted to the at least one of the display apparatus, the speaker, and the mobile device if the command has been determined to not have kind and positive intent.

17. The method according to claim 16, comprising filtering the command using the at least one machine learning model trained to identify kind and positive intent with the command to determine whether the command has kind and positive intent.

18. The method according to claim 17, wherein cause the at least one of a display apparatus, the speaker, and the mobile device to output the command or the one of the plurality of messages in a manner that is receivable from outside the vehicle comprises displaying the command with the display apparatus because the command has been determined to have kind and positive intent.

19. The method according to claim 17, wherein cause the at least one of the display apparatus, the speaker, and the mobile device to output the command or the one of the plurality of messages in a manner that is receivable from outside the vehicle comprises emitting an audio signal with the speaker corresponding to the command because the command has been determined to have kind and positive intent.

20. The method according to claim 17, wherein cause the at least one of the display apparatus, the speaker, and the mobile device to output the command or the one of the plurality of messages in a manner that is receivable from outside the vehicle comprises sending a transmission with the mobile device corresponding to the command because the command has been determined to have kind and positive intent.

* * * * *